Figure 1:
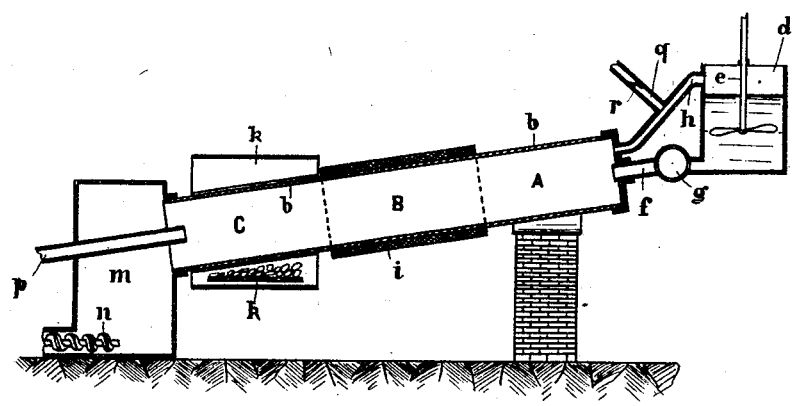

June 21, 1932.  F. JOURDAN  1,863,986
PROCESS FOR THE TREATMENT OF LEUCITIC ROCKS
WITH NITROUS VAPORS IN A CONTINUOUS CYCLE
Filed March 22, 1929

Inventor
Félix Jourdan

Patented June 21, 1932

1,863,986

UNITED STATES PATENT OFFICE

FÉLIX JOURDAN, OF ROME, ITALY

PROCESS FOR THE TREATMENT OF LEUCITIC ROCKS WITH NITROUS VAPORS IN A CONTINUOUS CYCLE

Application filed March 22, 1929, Serial No. 349,213, and in Italy April 18, 1928.

In the mechanical preparation of leucite for its successive treatment with a view to recovering therefrom potassic or sodic salts, and alumina, a considerable part of the ore is inevitably reduced to powder or to very fine grains so that it is rather difficult to submit it to the action of acids in the way followed usually.

However, applicant has ascertained that leucite in powder not only is easily attackable by acids in solution so that the potash, the alumina and the iron contained therein completely dissolve in ten minutes in nitric acid at 35° Bé. when it is worked at the temperature from 80° to 100° C., but it is also attackable by acids in the state of vapor and, for instance, it is easily attackable by vapors of nitric acid and by acids containing nitrous vapors in the presence of air and of water steam.

After the attack the mass obtained, which consists of a mixture of nitrate of potassium, of nitrate of aluminium and of iron and of silica with some slight impurity, may be dried and employed in this condition, thus utilizing the whole nitric acid employed. But if it is desired to separate the pure nitrate of potassium, after having dried the mass, it is necessary to heat the whole at a temperature which exceeds 140° C.; in this way the nitrates of aluminium and of iron decompose, developing nitrous vapors, and as residue is obtained an extremely divided mixture of silica, of alumina and of iron oxide, all products insoluble in water, together with the nitrate of potassium which, being soluble, may be removed by lixiviation; from a ton of leucite with 17% of $K_2O$ thus treated are recovered 360 kg. of nitrate.

The part of nitric acid employed, which thus remains fixed to the potassium, is utilized, but during heating for the purpose of decomposing the aluminium nitrate and the iron nitrate, as already stated, develops also nitric acid together with nitrous vapors and water, and the part of nitric acid originally employed for attacking the ore, which corresponds to this nitric acid and to these nitrous vapors, would become lost.

However, since, as already stated, powdered leucite may be efficiently attacked not only by nitric acid in solution, but also by nitric acid in the state of vapor and by simple nitrous vapors in the presence of air and of water with a yield of 97% of the nitric acid, according to the present invention these vapors, which develop during the dry decomposition of iron and aluminium nitrates, are utilized too by suitably causing them to act upon a new quantity of leucite to be treated.

Of course, it is necessary to take such steps as to substitute the quantity of nitric acid which in the first treatment had been established for the formation of the nitrate of potassium. However, always on the ground of the fact ascertained by applicant that leucite is easily attacked by nitric acid in the state of vapor and by nitrous vapors, the cost of the operation may be greatly reduced by using for attacking leucite, instead of nitric acid in aqueous solution as it is already on the market, nitrous vapors which serve to prepare it.

The treatment of leucite in the aforesaid manner may therefore be advantageously associated to a factory dealing with the fixation of atmospheric nitrogen and which works with the electric arc either for the oxidation of ammonia or for the treatment of atmospheric air. In both cases as immediate product are obtained hot gases which must be cooled down and which contain nitric acid, nitrous vapors and water vapor in proportions varying according to the circumstances. The proceedings for transforming combined nitrogen thus obtained into commercial nitric acid require a very costly plant and, moreover, the nitric acid thus produced must lastly be combined with a base in order to be able to utilize it as manure in agriculture.

According to the present invention this second part of the treatment is eliminated; the vapors containing combined atmospheric nitrogen are joined to the vapors which develop from the dry decomposition of aluminium and iron nitrates, and caused to act upon the leucite.

In this way there is no loss of nitric acid because the part not fixed in the nitrate of potassium is again utilized when a new charge of leucite is attacked, and the process may be conducted in a continuous cyclical way.

In fact, for this purpose it is only necessary to make use of a furnace formed, as will be better explained hereinafter, of a long rotatable tube of the type employed in the production of cement, in which the leucite is introduced at one end and leaves the same at the other end, thereby undergoing first the attack of the acid, then drying and thereupon roasting, in order to decompose the iron and aluminium nitrates, the vapors which develop in this latter stage being led to act together with the supplementary nitrous vapors upon the leucite to be decomposed.

In the case of the supplementary nitrous vapors being obtained from a plant for the production of ammonia, the plant itself may be simplified and the cost of production reduced by producing the oxidation of the ammonia in the moment of immitting it into the furnace in the following way:

The ammonia, mixed with a convenient quantity of air, is caused to pass upon a catalyst prepared with the methods known, and produces a complex mixture of nitric acid, nitrous vapors and water vapor. This mixture may be conveyed hot and directly into the rotary furnace for the attack of the leucite, thus permitting to avoid the costly plant for the production of the nitric acid in the towers as well as the cost for heating the rotary furnace.

Also in the case of fixing nitrogen in an electric arc furnace the nitrous vapors produced may be conveyed directly into the rotary furnace, and these vapors alone are sufficient for heating the furnace, thus saving the cost of the fuel.

The leucite is introduced into the furnace moistened, if necessary, with the quantity of water required for the regular accomplishment of the reaction with the nitrous vapors.

Figure 2:
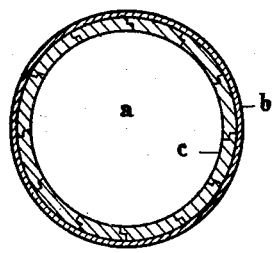

A rotary furnace for carrying out the process according to the present invention is schematically represented by way of example in the annexed drawing, in which Fig. 1 shows it in vertical longitudinal section, while Fig. 2 is a cross section thereof.

As it appears from the drawing, the furnace consists in a long tube —A— formed of an external casing —b— which may be of steel band, and of an internal lining —c— of bricks resisting to nitric acid, for instance of sandstone, of plates of silicious cast iron or of enamelled cast iron, of aluminium or the like. These bricks or these plates are fastened to the outer tube either with a convenient quality of cement or with bolts.

The leucite to be treated is contained in a tank —d— provided with a stirrer —e— which serves for mixing the leucite with water or with nitric acid, according to the circumstances, before introducing it into the furnace.

The feeding tank —d— is made of material resisting to nitric acid, it may be provided with cooling devices and serve for the condensation and the chemical combination of the nitric acid, of the nitrous vapors and of the water vapor, for the purpose of completing the recovery.

If the leucite is to be introduced into the furnace in the condition of dry powder, the feeding may be performed with a conveyor worm; if in the condition of paste, the leucite may descend by simple gravity from the tank —d— passing through the connecting pipe —f—, or this passage may be facilitated by means of a rotary pump —g—.

The leucite, which through the conduit —f— reaches the furnace, passes through a first zone —A— externally cooled with an air or water stream. The temperature of this first zone may be maintained, for instance, between 100° and 20° or between 100° and 90° C., according to the manner in which it is desired to perform the treatment.

If the temperature is maintained between 100° and 20°, it will be convenient that, as at this temperature takes place the condensation of nearly all vapors of water and of nitric acid arriving from the lower end of the furnace, the leucite be introduced in the form of nearly dry powder so as not to uselessly increase the quantity of water present.

If the temperature is maintained between 100° and 90° C., the acid and water vapors, which do not condense, will be brought to condensation by passing into the conduit —h— provided at the feeding tank —d—. In this case the leucite is introduced in powdered form into the tank —d— and mixed therein with the condensed vapors, whereupon the paste obtained will be caused to pass into the first zone —A— of the furnace by means of the pump —g—

In this first zone the nitrous vapors, the water and the nitric acid, in the presence of an excess of air, rapidly attack the leucite.

The leucite, in part decomposed, slowly advancing reaches the second zone —B— of the furnace, in which the temperature is higher, from 100° to 150°, and in this zone the attack is completed and the drying up of the product obtained starts.

The dried mixture reaches the third zone —C—, which is heated from 150° to 400–500° C., and in which takes place the decomposition of the iron and aluminium nitrates.

Both in the drying zone —B— and in the zone —C— of decomposition of the nitrates may be arranged stationary metal bars or placed free silex stones or shingles which by breaking up the mass prevent the material from adhering to the walls.

The furnace is heated from outside the zone —C—, for which purpose around the latter is arranged a heating chamber —k—, in which may be burnt any fuel whatever.

In the zone —B— it may be heated by means of the residual gases, or it will also be sufficient to provide an insulating heat proof lining —i—.

In the zone —A—, on the contrary, the furnace is maintained cooled either by simple radiation, leaving uncovered its envelope, or with an air and water stream.

At the end of the zone —C— the product obtained falls down into a closed discharge chamber —m—, from which it is removed by means of a conveyor worm —n—.

At the discharge chamber ends the conduit —p— which conveys the nitrous vapors required for the treatment, which mix with the nitrous vapors that are developed in the zone —C— and, flowing up with the latter ones along the furnace, meet with the leucite to be treated in the zone —A— or even are mixed up with the leucite in the feeding tank —4—.

Should there be in the cycle of treatment now dscribed an excess of water vapor, in order to eliminate it, one may proceed in such a way as to moderate the cooling of the first zone —A— of the furnace, to temporarily stop the immission of nitric acid through the conduit —p— and to expel the water in the form of steam, which is caused to leave the furnace through the discharge pipe —q— normally closed by a valve —r—.

The product coming out from the discharge chamber —m— of the furnace and which consists of a mixture of nitrate of potassium of aluminium and silica with a small quantity of iron oxide, may be directly sold with a view of being employed as manure, or it may be submitted to lixiviation in order to remove the soluble nitrate of potassium, utilizing the insoluble residue for other purposes.

I claim:

1. The process of treating leucite for the production of a mixture of nitrate of potassium, alumina and silica, enabling all the nitric acid employed to be utilized, which consists in attacking the leucite with vaporous nitric acid or a mixture of nitrous vapors with vaporous nitric acid and water vapor and air in excess of the proportions required for combining with the potassium, aluminium and iron contained in the leucite thus forming the corresponding nitrates.

2. The process of treating leucite as specified in claim 1, for the purpose of obtaining nitrate of potassium separated from the other substances, which consists in heating the product obtained from the leucite for the purpose of drying it, then increasing the temperature thereof to decompose the iron and aluminium nitrates, mixing the nitrous vapors developed during this decomposition, with a quantity of nitric acid equivalent to that which has combined with the potassium, and with the necessary quantity of water, and causing the mixture to attack a new quantity of leucite.

3. The process of treating leucite as specified in claim 1, for the purpose of obtaining nitrate of potassium separated from the other substances, which consists in heating the product obtained by attacking the leucite for the purpose of drying it, then increasing the temperature thereof to decompose the iron and aluminium nitrates, mixing the nitrous vapors developed during this decomposition, with a quantity of nitric acid equivalent to that which has combined with the potassium, and with the necessary quantity of water, and causing the mixture to attack a new quantity of leucite, said nitric acid being obtained from nitrous vapors formed during the fixation of atmospheric nitrogen either by the process of oxidizing ammonia or by the process of treating air with the electric arc.

4. The method of continually carrying out the process as specified in claim 1, which consists in subjecting the mass of powdered and granular leucite to gradually increasing temperatures and causing it to advance in counterflow with respect to the nitrous gases which act upon the leucite, said gases forming a mixture with the nitrous gases developed during treatment of the leucite, and said mixture being introduced to the leucite still to be treated.

5. The process of treating leucite to obtain a mixture of nitrate of potassium, alumina and silica, which comprises introducing the leucite in powdered form into a rotary furnace, mixing said leucite with nitrous vapors in a first comparatively cool zone of said furnace to form a mixture containing nitrates of aluminium, potassium and iron, drying said mixture in a second warm zone, subjecting said mixture in a third zone to a temperature sufficient to decompose said aluminium and iron nitrates, but insufficient to decompose said potassium nitrate, mixing the nitrous vapors produced by the decomposition with a quantity of fresh nitrous vapor equivalent to that which has been taken up by the potassium in forming potassium nitrate and passing said mixed vapors back to the leucite still to be treated.

6. The process, as specified in claim 5, wherein the second zone of the furnace is heated by the calories contained in the fresh nitrous vapor.

In testimony whereof I have affixed my signature this second day of March, 1929.

FÉLIX JOURDAN.